US007319969B2

(12) United States Patent
Mayer et al.

(10) Patent No.: US 7,319,969 B2
(45) Date of Patent: Jan. 15, 2008

(54) METHOD FOR DEPOSITING MAIL IN AN ELECTRONIC LOCKER SYSTEM AND ELECTRONIC LOCKER SYSTEM

(75) Inventors: Boris Mayer, Bonn (DE); Oliver Biegel, Bonn (DE)

(73) Assignee: Deutsche Post AG, Bonn (DE)

( * ) Notice: Subject to any disclaimer, the term of this patent is extended or adjusted under 35 U.S.C. 154(b) by 127 days.

(21) Appl. No.: 10/542,412

(22) Filed: Jul. 13, 2005

(65) Prior Publication Data
US 2006/0226979 A1 Oct. 12, 2006

(30) Foreign Application Priority Data
Jan. 14, 2003 (DE) ................ 103 01 137

(51) Int. Cl.
*G06Q 99/00* (2006.01)
*B65G 11/04* (2006.01)

(52) U.S. Cl. ........................................... 705/1; 232/45

(58) Field of Classification Search .................... 705/1; 232/26, 27, 29, 45
See application file for complete search history.

(56) References Cited

U.S. PATENT DOCUMENTS

| 4,894,717 A | * | 1/1990 | Komei | 348/150 |
| 5,126,732 A | * | 6/1992 | Mardon | 340/5.33 |
| 5,223,829 A | * | 6/1993 | Watabe | 340/5.73 |
| 6,862,576 B1 | * | 3/2005 | Turner et al. | 705/26 |
| 6,895,241 B2 | * | 5/2005 | Hara | 455/420 |
| 2002/0035515 A1 | * | 3/2002 | Moreno | 705/26 |
| 2004/0158351 A1 | * | 8/2004 | Rivalto | 700/237 |

FOREIGN PATENT DOCUMENTS

| DE | 101 24 707 A1 | 11/2002 |
| FR | 2 563 987 | 11/1985 |
| WO | WO 00/51750 | 9/2000 |
| WO | WO 01/52199 A2 | 7/2001 |
| WO | WO 02/097605 A1 | 12/2002 |

OTHER PUBLICATIONS

How the Lockers Work: Go to Website First, Dec. 8, 1999, The Straits Times (Singapore), Life; Life News, pp. 1-2.*
Secure Lockers taken on by JS, Jul. 20, 2002, The Grocer, pp. 1-2.*
Sanisbury's Tests Locker-Banks for Easier Collection, Aug. 9, 2002, Retail Week, pp. 1-2.*
International Search Report in PCT/DE2004/000013 dated Jun. 16, 2004.
International Preliminary Examination Report in PCT/DE2004/000013 dated Mar. 3, 2005.

* cited by examiner

*Primary Examiner*—Jamisue A. Plucinski
(74) *Attorney, Agent, or Firm*—Marshall, Gerstein & Borun LLP

(57) ABSTRACT

A method for depositing mail by a deliverer of mail in an electronic locker system provided with several lockable compartments. The method is characterized in that a controller of the locker system causes one or several compartments to open in order to deposit mail and at least one new compartment opens automatically when a compartment is closed and when detecting means of the locker system have detected information allocated prior to sending. Also disclosed is an electronic locker system suitable for the implementation of the method.

9 Claims, No Drawings

METHOD FOR DEPOSITING MAIL IN AN ELECTRONIC LOCKER SYSTEM AND ELECTRONIC LOCKER SYSTEM

BACKGROUND OF THE INVENTION

1. Field of the Invention

The invention relates to a method for depositing shipments by a deliverer into an electronic locker system having several lockable compartments, and relates to an electronic locker system for implementing the method for depositing shipments.

2. Related Technology

Electronic locker systems having several lockable compartments for depositing and picking up shipments are generally known. These shipments can be, for example, catalog products, food, or other shipments that are deposited by a deliverer into a compartment of the locker system for a specific recipient. In particular, locker systems are known for depositing and picking up shipments such as parcels and packages.

U.S. Pat. No. 6,344,796 B1 also discloses a storage device for depositing and picking up deliveries, whereby the device employed has a plurality of lockable compartments. A specific method of creating and checking a code is used in order to control access to the compartments. A free compartment can be assigned to the shipper or else he/she selects a free compartment.

WO 00/51750 A1 describes, for example, a locker system for receiving parcel shipments with a in which recipient data and parcel data are recorded in order to reserve an appropriate compartment in a system for a parcel that is to be delivered. At the time of the delivery, a control unit unlocks the reserved compartment. If it turns out, for instance, that the compartment is too small for the delivered shipment, then the control unit locks the originally reserved compartment and unlocks a compartment of the next size.

WO 01/52199 A2 discloses an electronic locker system with several compartments for receiving shipments. When a shipment is delivered, the deliverer is identified. After the identification has been verified, a control unit opens a reserved or free compartment of the appropriate size. After a shipment has been deposited, the compartment is closed automatically or manually.

WO 02/097605 A1 describes a locker system for receiving shipments, whereby the associated method calls for the identification of the deliverer. After the identification has been verified, a control unit opens up one single compartment lock or a group of compartment locks. Here, preferably several compartments are opened at the same time. FR 2 563 987, for example, describes a locker system that has at least one lockable compartment, input and display means as well as a connection to a remote computer. The publication discloses the basic principle of a method for the operation of lockable compartments in various embodiments.

With such types of locker systems, a deliverer typically identifies himself/herself at the locker system and uses an input means to select a mode for depositing shipments. Then the deliverer opens a first compartment, whereby the opening can also take place automatically, so that a door opens up. The deliverer places the first shipment into the compartment, whereby during this procedure, it is often the case that information in the form of Identcodes or other character strings associated with the shipments is recorded. After the compartment has been filled, the deliverer closes it and confirms the filling procedure, as a result of which the compartment is logged as having been filled. Then the deliverer opens the next compartment and the procedure is repeated with all of the individual steps.

When large numbers of shipments are deposited in several compartments of a system, the entire filling procedure is very time-consuming due to the various process steps required for each compartment. In addition to the negative time factor, this can also put a burden on the deliverer which, in turn, can lead to errors in the operation of the locker system. For example, parcels are placed incorrectly, parcels are forgotten or information is not correctly recorded. These drawbacks can occur not only with locker systems operated by postal service providers but also with any other kind of locker systems that are filled by deliverers.

GENERAL DESCRIPTION OF THE INVENTION

Therefore, the invention provides a method for depositing shipments into an electronic locker system in which the time needed by the deliverer to fill several compartments is reduced in comparison to known methods.

The invention provides a locker system for implementing such a method.

Accordingly, the invention provides a method for depositing shipments into an electronic locker system having several lockable compartments, control means of the locker system cause one or more compartments to open up for the depositing of shipments, and at least one new compartment opens automatically as soon as a compartment is closed and recording means of the locker system have previously recorded information, whereby the information is associated with the shipment.

The number of compartments that open at the beginning of the filling procedure can be stored in the control means. For example, just one empty compartment or else empty compartments of different sizes can open. A locker system typically has compartments of different dimensions in order to receive shipments of various sizes. The selection of the compartments to be opened initially can likewise be stored in the control means.

In another embodiment of the invention, the deliverer can select the number and sizes of the compartments to be opened, for example, at the beginning of the filling procedure.

The invention also provides that a new compartment opens up automatically as soon as the deliverer closes a compartment and recording means have previously recorded information that is associated with the shipment. This information is, for example, one or more Identcodes or other character strings. The term "recording means" encompasses as any means that is suitable for recording information such as, for example, scanners for reading in codes, keyboards for entering character strings or touchscreens.

If the deliverer closes a compartment before information associated with the shipment has been recorded, it has proven to be advantageous for the compartment to automatically open up again. In this manner, for instance, it can be prevented that a shipment—due to the closing and simultaneous confirmation procedure—is logged as having been deposited even though no shipment was placed at all. On the other hand, if the deliverer closes a compartment after the information associated with the deposited shipment has been properly recorded, then the closing of the compartment is construed as a confirmation and the compartment is logged as having been filled. The deliverer does not have to once again confirm the procedure via the input means and initiate the beginning of the next filling procedure, but rather this is done automatically according to the invention.

An especially preferred embodiment of the invention is characterized in that the filling procedure is terminated when a termination function is selected.

In an especially preferred embodiment of the invention, the deliverer can only terminate the entire filling procedure and close all of the opened compartments consecutively once he/she has previously selected an appropriate function via the input means. Only in that case is the closing of a compartment not logged as a confirmation and filling of a compartment. This is not possible if he/she has previously recorded information associated with a shipment, since it can be assumed that a shipment was deposited and this must not remain without a confirmation and logging.

Moreover, it is advantageous to configure the invention in such a way that the amount of time that has lapsed since the compartment was closed and/or since the locker system was operated in any other way is recorded and that the filling procedure is terminated once a predefinable time interval has been exceeded.

The predefinable time interval can be freely selected and preferably amounts to between 15 seconds and two minutes, whereby values between 30 seconds and 90 seconds are especially preferred.

An especially advantageous embodiment of the method calls for configuring the locker system in such a way that, after the time interval has lapsed, no more compartments can be opened and/or closed.

This measure prevents the possibility that fraudulent objects might be placed into the parcel compartment system. Moreover, this means that the automatic termination of the filling procedure can be achieved in an especially simple and advantageous manner.

The invention provides an electronic locker system for implementing the method according to the invention for depositing shipments by a deliverer, having input means and display means for carrying out a dialog with the deliverer, whereby the input means is connected to control means and the locker system has several lockable compartments with locking mechanisms, whereby these locking mechanisms can be actuated by the control means on the basis of stored instructions and information that has been entered via the input means.

The stored instructions are, for example, the number and size of the compartments to be opened at the beginning of the filling procedure. The information entered via the input means can be numbers selected manually by the deliverer and/or it can be the selection of a filling mode.

The invention also relates to an electronic locker system for implementing a method for depositing shipments by a deliverer. The locker system has input means and display means for carrying out a dialog with the deliverer, whereby the input and display means are connected to the control means. The system also has several lockable compartments with locking mechanisms, whereby these locking mechanisms can be actuated by the control means on the basis of stored instructions and information entered via the input means.

Additional advantages, special features and practical refinements of the invention can be gleaned from the following description of preferred embodiments of the invention.

DETAILED DESCRIPTION

In an especially preferred embodiment of the invention, a deliverer identifies himself/herself at an electronic locker system, thereby logging into the control system of the locker system at the beginning of the filling procedure. The identification can take place through various known identification methods. For example, entering a code or reading in a card are options.

Electronic locker systems typically comprise means for controlling the system in various modes. These control means include, for example, computer means and mechanical and/or electronic circuits by means of which the locker system is operated. In particular, the control means actuate locking mechanisms of the compartment doors and thus open and close compartments. Moreover, the control means are connected to input means and output means such as monitors, keyboards and/or touchscreens. The deliverer uses these input and display means to carry out a dialog with the locker system;

In order to deposit shipments, he/she selects, for instance, the mode "deliver parcels." Information can be stored in the control means about how many compartments should open up at the beginning of this selected mode. It has been found to be advantageous, for example, for one compartment of each available size to open up for the deliverer. That way, he/she has a suitable compartment available for all possible shipment sizes. If the locker system has, for example, three different compartment sizes, then one compartment of each size would open up.

However, it can also be advantageous for the deliverer to individually select the number of compartments and their size. If the deliverer knows, for instance, that he/she only needs a specific compartment size for the following filling procedure, he/she can select this size. In this case, the deliverer would use the input means to indicate the desired compartments to the control means of the locker system, which would then process the information and open the desired number of compartments in the appropriate sizes.

In both cases, one or more empty compartments open up so that shipments can be deposited.

The shipments to be deposited can be, for example, of various kinds with the appertaining process steps. In typical logistic systems, for example, in the realm of postal applications, parcels or packages are associated with identification means such as codes, so that the route of a particular shipment can be controlled and tracked as efficiently as possible. Conventionally, such a code has to be recorded by the recording means of a locker system when a shipment is deposited. For example, a postal number in the form of a scanned-in code or a character string entered via a keyboard is recorded.

Whereas the recording of a postal number that identifies the shipment is advantageously provided for each shipment, it is also possible to have shipments that are additionally provided with a special Identcode that likewise has to be scanned in before the shipment is deposited. Furthermore, these can be C.O.D. deliveries with C.O.D. amounts that have to be entered, or any other special shipment calling for additional steps.

At the end of each filling procedure, the deliverer closes the compartment, which is construed as confirmation of the procedure. In an especially preferred embodiment, the confirmation means that the compartment is logged as having been filled. Thus, no more manual confirmations from the deliverer are needed, which reduces the filling time needed per compartment. Moreover, according to the invention, after the closing of a compartment, a new compartment automatically opens up so that the opening of a new compartment does not have to be initiated by the deliverer through additional manual input. This translates into additional time savings.

In addition to reducing the time needed, the automatic confirmation and opening approach has the advantage that the steps to be carried out by the deliverer are simplified and reduced in number, thus making his/her job easier. This, in turn, enhances his/her concentration so that fewer errors occur during the filling procedure. In actual practice, it has been found that deliverers are so familiar with the work steps at a locker system that the appertaining input and display means often respond too slowly to keep up with the deliverer, who is ready for the next step. This can cause the deliverer to become impatient and lose concentration. Particularly when a locker system is to be filled with a large number of shipments, the constantly recurring procedures, which have to be initiated and confirmed individually, cause the work to be more stressful and time-consuming.

Consequently, the reduction according to the invention of the process steps and of the work steps speeds the filling procedure, alleviates the workload of the deliverer and reduces the potential for errors. In order to check the consecutive filling of already opened compartments and to avoid errors, advantageous refinements can be provided in embodiments of the invention.

For example, it is advantageous for the new compartment that is opened after the closing of a compartment to have the same dimensions as the one that was previously closed. Here, it is assumed that a locker system typically has different sizes of compartments so that shipments with different dimensions can be accommodated, whereby the available-space is utilized as optimally as possible. Therefore, small shipments are preferably placed into small compartments so as not to waste any space in larger compartments. If the control means are programmed in such a way that, at the beginning, they open a certain range of sizes, then it is advantageous, every time a compartment is closed, to: offer the deliverer a compartment of the same size so that he/she always has the same range of sizes to choose from. If no compartment of that size is available, then the next-larger compartment could be opened. It can also be provided that the deliverer is informed via a display about this and can select the further course of action.

Since the closing of a compartment is construed as a confirmation of the filling procedure, there is a risk that a deliverer might inadvertently close a compartment even though, for example, he/she has not placed any shipment into it or necessary information has not been recorded. Therefore, it is advantageous that the closing of a compartment is only construed as a confirmation once all of the necessary information has previously been recorded. In an especially preferred embodiment of the invention, this includes a postal number that is scanned in or entered for each shipment. If this has not yet been done, it is advantageous for the compartment to open up again automatically so that it cannot be closed. In this manner, no existing parcel will be logged as having been "deposited" and no important information can be forgotten for deposited shipments.

In order to terminate the entire filling procedure and to be able to close all of the compartments that are still open, the deliverer has to transmit this information to the control means of the locker system since otherwise the compartments cannot be closed. For this purpose, he/she can select an appropriate function, for example, "terminate filling." Now the compartments can be closed without the procedure being construed as confirmation of the placement of a shipment. However, this presupposes that no information about the shipment has previously been recorded since this would mean that this is a confirmation of a filling procedure after all.

If an error has occurred nevertheless during the filling of the compartments, another function, for example "cancel", can be provided, which allows the deliverer to open an incorrectly filled compartment and to correct the filling. The completed procedure is thus reversed and the compartment in question opens up automatically.

The invention claimed is:

1. A method for deposition of shipments by a deliverer into an electronic locker system having a plurality of lockable compartments, the method comprising:
   identifying the deliverer;
   opening a compartment for depositing a shipment;
   recording information associated with the shipment;
   closing the compartment containing the shipment;
   automatically opening another compartment as soon as the compartment containing the shipment is closed; and
   terminating the deposition of shipments by closing all open compartments.

2. The method according to claim 1, comprising terminating the deposition of shipments by selecting a termination function.

3. The method according to claim 1, comprising terminating the deposition of shipments when an idle time, during which the locker system has not been operated, exceeds a predetermined time interval.

4. The method according to claim 1, comprising logging the compartment as being filled if the compartment is closed successfully.

5. The method according to 1, comprising detecting dimensions of the closed compartment, and automatically opening another compartment having similar dimensions as the closed compartment.

6. The method according to claim 1, comprising automatically opening another compartment until there are no more empty compartments to open.

7. The method according to claim 1, comprising preventing closing of the compartment if information associated with the shipment was previously recorded.

8. The method according to claim 1, comprising automatically reopening the compartment if no information associated with the shipment is recorded.

9. The method according to claim 1 comprising canceling the deposition of the shipment by selecting an appropriate function at an input device to reopen the compartment.

* * * * *

UNITED STATES PATENT AND TRADEMARK OFFICE
CERTIFICATE OF CORRECTION

PATENT NO. : 7,319,969 B2  Page 1 of 1
APPLICATION NO. : 10/542412
DATED : January 15, 2008
INVENTOR(S) : Boris Mayer et al.

It is certified that error appears in the above-identified patent and that said Letters Patent is hereby corrected as shown below:

Title Page

Before INID code (30) Foreign Application Priority Data, insert --(86) PCT No.: PCT/DE04/000013.........01/09/2004--.

Signed and Sealed this

Fifth Day of August, 2008

JON W. DUDAS
*Director of the United States Patent and Trademark Office*